(12) United States Patent
Tentarelli

(10) Patent No.: US 7,871,579 B2
(45) Date of Patent: Jan. 18, 2011

(54) TUBULAR REACTOR WITH EXPANDABLE INSERT

(75) Inventor: Stephen Clyde Tentarelli, Schnecksville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 332 days.

(21) Appl. No.: 12/190,931

(22) Filed: Aug. 13, 2008

(65) Prior Publication Data

US 2010/0040190 A1 Feb. 18, 2010

(51) Int. Cl.
 B01J 8/02 (2006.01)
 B01J 8/04 (2006.01)
 B01J 19/00 (2006.01)

(52) U.S. Cl. .............. 422/211; 422/218; 422/221; 422/222; 422/191; 422/192; 422/193; 422/197

(58) Field of Classification Search ................. 422/211, 422/218, 221, 222, 191, 192, 193, 197, 198
See application file for complete search history.

(56) References Cited

U.S. PATENT DOCUMENTS

| | | |
|---|---|---|
| 4,340,501 A | 7/1982 | Davidson |
| 4,719,090 A | 1/1988 | Masaki |
| 5,350,566 A | 9/1994 | Stringaro |
| 6,859,472 B2 | 2/2005 | Betin et al. |
| 7,025,339 B2 | 4/2006 | Meski et al. |
| 7,056,083 B2 | 6/2006 | Gray |
| 7,100,381 B2 | 9/2006 | Hale et al. |
| 2005/0016170 A1 | 1/2005 | Pellizzari |
| 2005/0112056 A1 | 5/2005 | Hampden-Smith et al. |
| 2006/0008399 A1 | 1/2006 | Feinstein |
| 2007/0227173 A1 | 10/2007 | Bezama et al. |
| 2007/0297956 A1 | 12/2007 | Repasky et al. |
| 2008/0145284 A1 | 6/2008 | Whittenberger et al. |

FOREIGN PATENT DOCUMENTS

| | | |
|---|---|---|
| EP | 0 025 308 B1 | 7/1984 |
| WO | 2006058060 A2 | 6/2006 |

*Primary Examiner*—Walter D Griffin
*Assistant Examiner*—Lessanework Seifu
(74) *Attorney, Agent, or Firm*—Bryan C. Hoke, Jr.

(57) ABSTRACT

A tubular reactor having an insert for improving heat transfer characteristics of the tubular reactor. The insert comprises a catalyst and metal structures consecutively arranged in a lengthwise direction of the tube. The metal structures have radially expandable side walls and orifices for squeezing fluid between the metal structures and the tube wall. The radially expandable side walls form hollows between the radially expandable side walls and the tube wall of the tubular reactor. The radially expandable side walls deform responsive to the fluid pressure difference between the inside of the metal structure and the outer space between the metal structure and the tube wall thereby maintaining the gap between the orifice opening and the tube wall to adjust for tube creep.

13 Claims, 2 Drawing Sheets

TUBULAR REACTOR WITH EXPANDABLE INSERT

BACKGROUND

The present invention relates to a tubular reactor for producing a product mixture from a reactant mixture. More specifically, the present invention relates to heat transfer in tubular reactors.

Reactors containing packings with catalyst have been described, for example, tubular reactors used in steam methane reforming. The packings may be random packings such as catalyst pellets or so-called structured packing. Structure packing, as compared to random packings, can produce lower pressure drop, are not easily fluidized, and are not prone to settling or crushing. Since tubular reactors are often externally heated or cooled, another important characteristic of the reactor is related to heat transfer between the external heat source/sink and the process fluid within the reactor.

Tubular reactors may contain random packing or structured packing where the packing includes catalyst for the desired reaction. Structured packing has been credited with lower pressure drop and improved heat transfer compared to random packing.

Heat transfer in tubular reactors has been recognized as being important. Efforts relating to improving heat transfer in tubular reactors have been described.

Davidson, U.S. Pat. No. 4,340,501, describes a structure in a reactor vessel where the fluid is intermittently but controllably brought into contact with the vessel walls. As a result, Davidson states that it is possible to obtain the smooth-flow characteristics of honeycomb structures with the heat transfer characteristics of particulate beds.

In the invention according to Davidson, the process for contacting a fluid with the walls of a vessel is characterized by causing the fluid to flow alternatingly (a) through a structure within the vessel, and (b) through a space between the structure and the vessel walls. Davidson also describes an apparatus for carrying out the process comprising a vessel and a structure inside the vessel.

Repasky et al., U.S. Pat. Pub. No. 2007/0297956 discloses a method and a reactor made by a method for increasing heat transfer in a tubular reactor with a structured packing. The approach is to expand the structure toward the tubular reactor wall during construction, to squeeze the fluid between the packing and the tube wall, increasing the velocity of the fluid near the wall and thereby increasing heat transfer.

A problem with this approach and any approach where heat transfer relies on the gap between the structure and the tube wall, is that after extended operation at high temperature and pressure, the tube may experience time-dependent plastic deformation, commonly known as "creep," resulting in an increase in the tube diameter and a corresponding increase in the gap between the tube wall and the structured packing. Since the mechanism for heat transfer relies on the velocity of the fluid in this gap, and the velocity decreases as the gap is increased, the heat transfer decreases when the tube creeps. When heat transfer is reduced, the reactor performance decreases.

It would be desirable to maintain heat transfer efficiency in a tubular reactor throughout the life of the tubular reactor especially when the tube creeps. The present invention solves the problem of heat transfer degradation resulting from tube creep in a tubular reactor.

BRIEF SUMMARY

The present invention relates to a tubular reactor for producing a product mixture from a reactant mixture. The tubular reactor has a tubular reactor inlet and a tubular reactor outlet downstream of the tubular reactor inlet. The tubular reactor comprises a tube having a tube wall, and an insert. The insert comprises a catalyst and a plurality of metal structures arranged consecutively in the lengthwise direction of the tube, each of the plurality of metal structures having an upstream end, a downstream end and a radially expandable side wall enclosing a central space between the upstream end and the downstream end, wherein the upstream end defines an inlet to the central space, wherein the central space is at least partially blocked at the downstream end, and wherein the radially expandable side wall defines a plurality of orifices for passing a fluid from the central space toward the tube wall, the plurality of orifices characterized by a hydraulic diameter, d, and a spacing, h, from the tube wall, wherein h/d for the plurality of orifices ranges from 0.05 to 10 or ranges from 0.1 to 1, and wherein each of the plurality of metal structures form an outer space having a plurality of hollows between the radially expandable side wall of each of the plurality of metal structures and the tube wall, wherein the outer space is at least partially blocked at the upstream end and wherein the outer space is in fluid flow communication with the inlet of an adjacent downstream metal structure and/or the tubular reactor outlet.

Suitable spacings, h, may depend on the tube diameter and may range from 0.0001 to 0.02 of the tube diameter. The spacing, h, may range from 0.01 mm to 2 mm.

The radially expandable side wall may have a thickness ranging from 0.05 mm to 0.5 mm. Suitable wall thickness may depend on the diameter of the tube.

The central space may be completely blocked at the downstream end.

The outer space may be completely blocked at the upstream end.

The catalyst may be supported on the plurality of metal structures.

The catalyst may be supported on catalyst pellets. The catalyst pellets may be located in the central space of each of the plurality of metal structures.

The insert may comprise a metal substructure situated within the central space of a metal structure of the plurality of metal structures wherein the catalyst is supported on the metal substructure.

The tube may be characterized by a cross-sectional area, $A_t$, and the outer space for each of the plurality of metal structures may have a cross-sectional area, $A_a$, wherein $$0.1 \leq \frac{A_a}{A_t} \leq 0.5$$

at any position between the upstream end and the downstream end of each of the plurality of metal structures.

The downstream end of a first of the plurality of metal structures may be spaced a distance, D, from a second of the plurality of metal structures, wherein the second of the plurality of metal structures is adjacent and downstream of the first of the plurality of metal structures. Suitable distances, D, may depend on the diameter of the tube used for the tubular reactor. The distance, D, may be 0.1 to 0.5 of the tube diameter. The distance, D, may be 0.6 cm to 50 cm.

The catalyst may be a steam reforming catalyst.

DETAILED DESCRIPTION

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The phrase "at least a portion" means "a portion or all."

The term "blocked" means obstructed or hindered. As applied to a flow passage it means that flow to or through the passage is restricted. Blockage may be affected by the geometry of the passage or other means to restrict the flow.

The present invention relates to a tubular reactor for producing a product mixture from a reactant mixture. More specifically, the present invention relates to heat transfer in tubular reactors.

The tubular reactor may be particularly suited for the production of hydrogen and/or synthesis gas (syngas) where the product mixture may comprise $H_2$ and CO. The method and tubular reactors may also be used for other reaction process, such as water gas shift, partial oxidation and hydrogenation.

Tubular reactors are well-known in the chemical and petrochemical industries. As defined herein, a "tubular reactor" is any reactor comprising a tube enclosing a catalyst on a support.

The present invention is concerned with non-adiabatic tubular reactors where heat is supplied or removed from the tubular reactor through the tube wall.

Figure 1A:
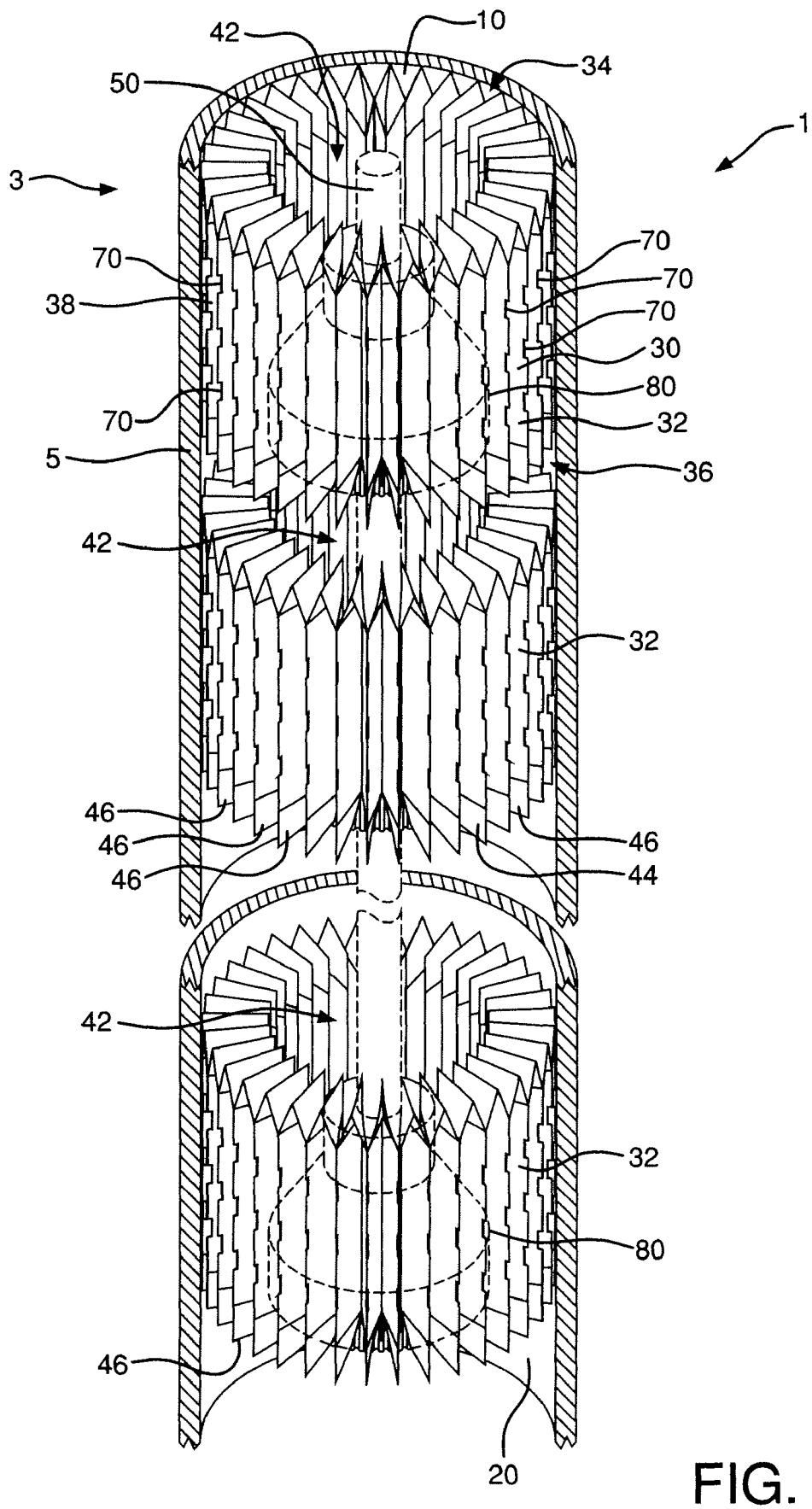
FIG. 1A is a schematic of a tubular reactor with an insert having a plurality of metal structures for squeezing fluid between the structures and the tube wall with FIG. 1B illustrating details of a pleated cone.

With reference to FIG. 1A, a tubular reactor 1 is shown. The tubular reactor 1 comprises a tube 3 and an insert 30. The tube 3 has a tube wall 5. The tubular reactor 1 has a tubular reactor inlet 10 and a tubular reactor outlet 20 downstream of the tubular reactor inlet 10.

A "tube" is defined herein as any hollow body for conducting or conveying a fluid within the tube. The tube may have circular cross section, a square cross section or other desired shape. The tube has a longitudinal axis running lengthwise and positioned along the geometric centers of the cross sections of the tube. The lengthwise direction corresponds to the direction from the inlet to the outlet of the tubular reactor.

The tube may be fabricated from any material suitable for the desired application. Suitable materials for tubular reactors for hydrogen and/or syngas production are known in the art.

The insert 30 comprises a catalyst and a plurality of metal structures 32. An "insert" is anything that is inserted or is for insertion. The insert 30 is situated within the tube 3. As used herein "plurality" means at least 3.

The catalyst may be supported on random packing such as catalyst pellets or the catalyst may be supported on so-called structured packing. The catalyst may also be supported directly on the metal structures 32. Suitable catalysts for desired reactions are known in the art. For the case of hydrogen and/or synthesis gas production, the catalyst may be a steam reforming catalyst. Suitable catalysts for steam methane (steam hydrocarbon) reforming are known in the art. The catalyst may be supported on the pellets, structured packing and/or metal structure by any means, for example coating, impregnating or otherwise affixing the catalyst to the support. Any suitable catalyst for the desired reaction may be selected and used in the tubular reactor.

The metal structures 32 are arranged consecutively in the lengthwise direction of the tube 3 as shown in FIG. 1A. The length of a metal structure may be 0.3 to 3 times the tube diameter. The metal structures 32 may be spaced apart from each other. The spacing may be provided by spacers (not shown) or each of the plurality of metal structures may be attached to a rod 50 connected to each of the plurality of metal structures and running the length of the tube. The rod 50 may be located in the center of the tube 3 coincident with the tube longitudinal axis. Alternatively, the rod may be offset from the center of the tube. Individual rods in each insert may be joined together to form a continuous linkage.

The downstream end of a first of the plurality of metal structures may be spaced a distance, D, from a second of the plurality of metal structures, wherein the second of the plurality of metal structures is adjacent and downstream of the first of the plurality of metal structures. Suitable distances, D, may depend on the diameter of the tube used for the tubular reactor. The distance, D, may be 0.1 to 0.5 of the tube diameter. The distance, D, may be 0.6 cm to 50 cm.

Each of the plurality of metal structures 32 has an upstream end 34, a downstream end 36 and a radially expandable side wall 38 that encloses a central space between the upstream end 34 and the downstream end 36 and is surrounded by an outer space 44 formed between the radially expandable side wall 38 and the tube wall 5. "Radially expandable" means expandable in a direction perpendicular to the lengthwise direction of the tube.

The central space is at least partially blocked at the downstream end 36. The central space may be completely blocked or closed at the downstream end. The means for providing the at least partial blockage of the downstream end of the central space should not be so rigid as to excessively restrict the movement of the radially expandable side wall 38.

The outer space 44 is at least partially blocked at the upstream end 34. The means for providing the at least partial blockage of the upstream end of the outer space should not be so rigid as to excessively restrict the movement of the radially expandable side wall 38.

The outer space 44 is at least partially blocked at its upstream end 34 to force at least a portion of the fluid that is flowing through the tubular reactor to flow into the inlet 42 to the central space. The central space is at least partially blocked at the downstream end 36 to force at least a portion of the fluid that flows into the central space to flow through a plurality of orifices 70 in the radially expandable side wall 38 and toward the tube wall.

The insert may comprise random packing for supporting the catalyst, where the random packing is situated in the central space. Random packing may be contained within a cage which is attached to the rod 50 for support.

The insert may comprise a metal substructure situated within the central space of the metal structure of the plurality of metal structures wherein the catalyst is supported on the metal substructure. The metal substructure may be so-called "structured packing." The metal substructures may be physically attached or part of the metal structures 32 or may be unattached and setting in the metal structures 32. The metal substructures may be attached directly to the rod 50 for support.

Among the structured packing types that may be used include ceramic honeycombs, metal honeycombs, plate stacks, and the like. The structured packing may be constructed of any material and/or alloy commonly used for structured packings, for example, cordierite, corundum, FeCrAlloy, 300-series stainless steels, Inconels, aluminum, or even carbon steel. Suitable materials having corrosion resistance and mechanical properties for the service for which they are to be used are known in the art.

The radially expandable side wall 38 has a plurality of orifices 70 suitable for passing fluid from the central space and squeezing the fluid between the insert and the tube wall 5. As used herein, an orifice is an opening (such as a hole) through which something may pass. Orifices may be circular holes or may have other desired shapes such as slits or slots. The plurality of orifices 70 are characterized by a hydraulic diameter, d, and a spacing, h, from the tube wall 5, wherein h/d for the plurality of orifices 70 is in a range of 0.05 to 10 or a range of 0.1 to 1. Suitable spacings, h, may depend on the tube diameter and may range from 0.0001 to 0.02 of the tube diameter. The spacing, h, may be in a range of 0.01 mm to 2 mm or in a range of 0.01 mm to 0.5 mm. For the purposes of this disclosure, the spacing, h, is the distance between the geometric center of the orifice and a point on the tube wall closest to the geometric center of the orifice.

The hydraulic diameters, d, of the plurality of orifices, the shapes of the plurality of orifices, the spacing between the orifices, and the spacings, h, may vary in the longitudinal direction along the length of the tube and along the length of a single metal structure to tailor the heat transfer profile in the tube. Heat transfer may be tailored to reduce thermal stresses in the tube.

Each of the plurality of metal structures 32 define an outer space 44 between the radially expandable side wall 38 of each of the plurality of metal structures 32 and the tube wall 5. The outer space is at least partially blocked at the upstream end to force the fluid to the inlet 42 to the central space. The outer space 44 is in fluid flow communication with the inlet 42 of an adjacent downstream metal structure 32 and/or the tubular reactor outlet 20.

"Adjacent" means nearby and may or may not include contact but does require absence of anything of the same kind in between.

The outer space is for collecting the fluid after it passes through the plurality of orifices 70 and by the tube wall and for passing the fluid to at least one of the inlet of an adjacent downstream metal structure and the reactor outlet. The outer space for the metal structure furthest downstream will be in fluid flow communication with, and thereby pass the fluid to the tubular reactor outlet. An outer space in fluid flow communication with the inlet of an adjacent downstream metal structure, means that at least a portion of a fluid flowing through the outer space will pass into the inlet of the adjacent downstream metal structure. There may be a volume/space between the downstream end of a metal structure and the upstream end of the adjacent downstream metal structure.

The side wall 38 of each of the plurality of metal structures 32 defines a plurality of hollows 46 forming the outer space 44 with peaks that may contact the tube wall 5, thereby maintaining the spacing, h, and limiting creep deformation of the insert. A hollow is a cavity formed by a depression in the side wall. The hollows may be v-shaped, u-shaped, sinusoid-shaped or any other desired shape as long as they allow the side wall to be radially expandable. The plurality of hollows provide a passage for the fluid to flow axially and move toward the inlet of the adjacent downstream metal structure and/or the tubular reactor outlet after the fluid squeezes between the metal structure and the tube wall. A suitable number of hollows for each metal structure may be determined without undue experimentation.

The tube may be characterized by a cross-sectional area, $A_t$, and the outer space including the hollows for each of the plurality of metal structures may be characterized by a cross-sectional area, $A_a$. The cross-sectional area, $A_a$, is the cumulative area for all of the hollows for a cross section. For each of the plurality of metal structures, $$\frac{A_a}{A_t}$$

may range from 0.1 to 0.5 at any position between the upstream end and the downstream end. The cross-sectional area of the tube and the cross-sectional area for the outer space are defined on a plane perpendicular to the tube axis at the same lengthwise position. The cross-sectional area of the tube depends on the application. The cross-sectional area of the tube may be from 1 cm$^2$ to 1 m$^2$ or from 1 cm$^2$ to 500 cm$^2$. The ratio $$\frac{A_a}{A_t}$$

may vary along the length of the tube and along the length of a single metal structure.

The side wall is expandable, meaning that the side wall of the metal structure is able to deform without rupture, responsive to the fluid pressure difference between the central space and the outer space. The side wall is able and is intended to move outward toward the tube wall due to the force of the fluid. The movement of the side wall stops when the peaks contact the tube wall. The metal structures are flexible in the radial direction to adjust for tube creep, for differential thermal expansion between the metal structure and the tube, and for variations in fabrication tolerances. The radially expandable side wall can accommodate for this.

The expandability of the side wall depends at least on the elastic modulus and creep strain properties of the metal at the operating temperature, the thickness of the radially expandable side wall and the geometry of the radially expandable side wall. The thickness of the radially expandable side wall may be in the range of 0.05 mm to 0.5 mm. Suitable wall thickness may depend on the diameter of the tube. The thickness may be increased for larger tube diameter. The fluid pressure difference between the central space and the outer space will depend at least on the orifice dimensions, the number of orifices, the spacing of the orifice from the tube wall, and the flow rate of the fluid passing through the orifice.

In addition to producing a net radial force on the radially expandable side wall, the fluid pressure difference also produces a circumferential force which may tend to collapse the hollows. To overcome this potential problem, the radially expandable side wall may include an out-of-plane feature in the circumferential direction that provides mechanical strength in the circumferential direction. The out-of-plane feature may be, for example, ribs or corrugations in the side wall of the metal structure.

The radially expandable sidewall 38 of the metal structure can be fabricated from sheet metal that is pleated (folded) and then formed into a cylindrical shape, herein termed a "pleated cylinder". The height of the pleats may be in the range of 5% to 40% of the tube inside diameter. The outside edges of the pleats have orifices that are spaced intermittently along the lengthwise direction of the pleats. When placed in the tube, the axial flow passages (hollows) that are formed between the outside surface of the pleated cylinder and the inside surface of the tube wall are the outer space 44, and the inside surface of the pleated cylinder forms the central space.

The metal structure can be compressed slightly in the radial direction so that it can be inserted into the tube during construction of the tubular reactor. Upon operation, the sidewall will be pushed against the tube either due to the initial elastic flexibility of the side wall or due to fluid pressure forces.

The upstream end of the hollows can be at least partially blocked without restricting the movement of the radially expandable pleated cylinder by cutting the outside folds at the upstream end of the pleated cylinder for a short distance, approximately 50% to 200% of the height of the pleats, thereby forming loose flaps, and then joining the ends of the flaps together in pairs. Numbering the flaps sequentially from 1 to N, around the circumference of the pleated cylinder, flap 2 is joined to flap 3, flap 4 is joined to flap 5, flap 6 is joined to flap 7, continuing until flap N is joined to flap 1. With this geometry, the upstream end of the pleated cylinder retains its radial flexibility.

Figure 1B:
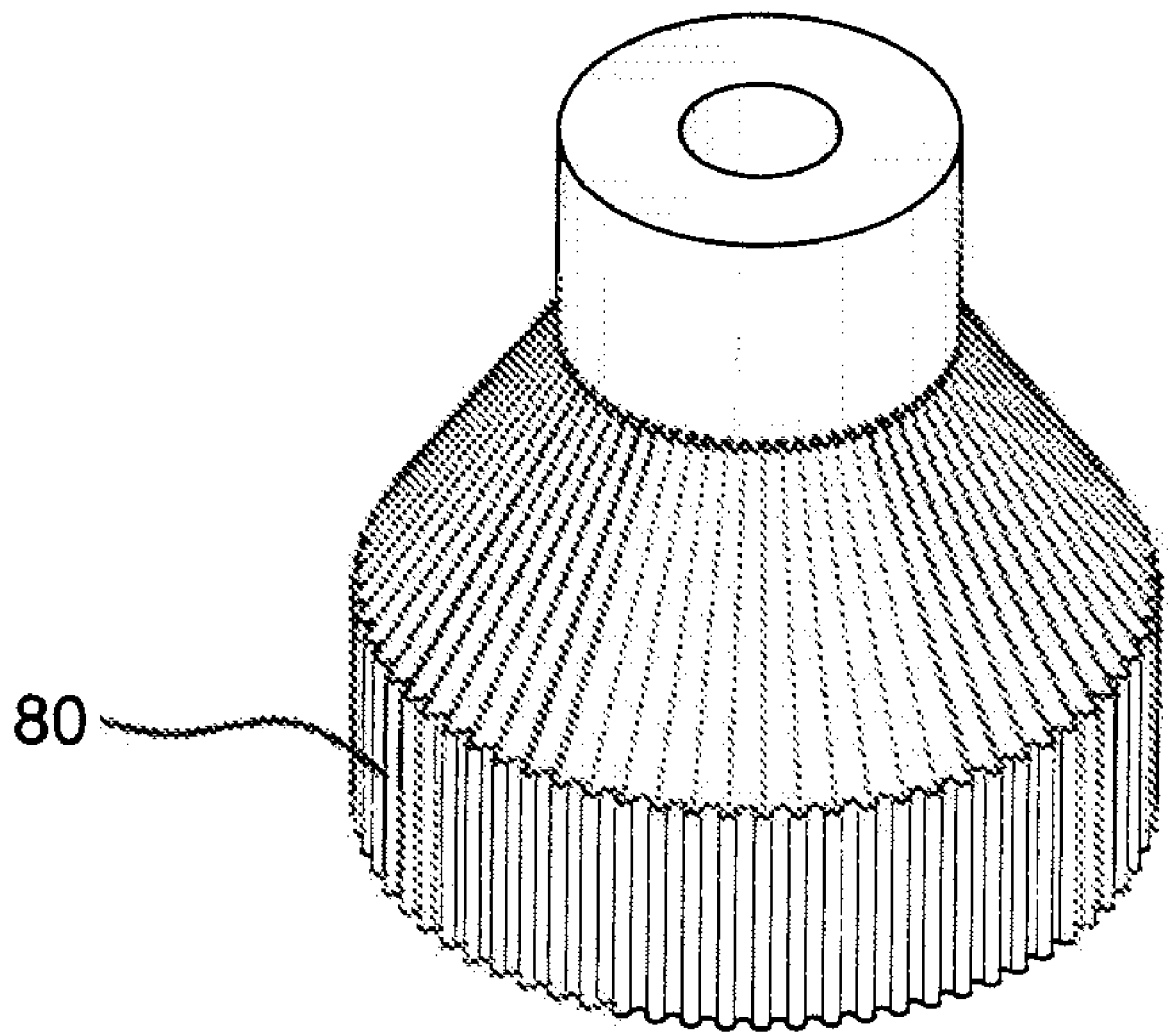

The downstream end of the central space that is formed by the pleated cylinder can be at least partially blocked without restricting the movement of the radially expandable pleated cylinder by using two steps. First, the inside folds at the downstream end of the pleated cylinder are cut for a short distance, approximately 50% to 200% of the height of the pleats, to form loose flaps, and the ends of the flaps are joined together in pairs. Using the same numbering scheme as was used for the flaps on the upstream end, flap 1 is joined to flap 2, flap 3 is joined to flap 4, flap 5 is joined to flap 6, continuing until flap N−1 is joined to flap N. Second, a pleated cone 80 formed from metal sheet is inserted into the downstream end of the pleated cylinder and attached to the inner folds of the pleated cylinder by tack welding or spot welding and is attached to the rod 50. The pleated shape of the pleated cone provides radial flexibility so as not to restrict radial movement of the side wall and mechanical strength to withstand fluid forces that result from the pressure difference between the upstream and downstream sides of the pleated cone. The pleated cone 80 may be oriented with the smaller diameter end of the cone facing in the upstream direction, as shown in FIG. 1A, or in the downstream direction (not shown). Finer features of the pleated cone 80 are shown in FIG. 1B.

The inner edge between the edge adjacent to flap 1 and the edge adjacent to flap N may also be joined.

When placed in the tube, axial flow passages (hollows) are formed between the outside surface of the pleated cylinder and the inside surface of the tube wall. The upstream end of these hollows are essentially blocked by the flaps that have been joined together at the upstream end of the hollows. At the downstream end of the hollows, the passages are open. The central space that is formed by the inside surface of the pleated cylinder is essentially blocked by the flaps that have been joined together at the downstream end of the central space and by the pleated cone 80.

Other means for at least partially blocking the upstream end of the outer flow passage are (1) covering the hollows with a flat ring plate, and (2) covering the hollows with a corrugated ring plate. The flat ring plate may not be able to move radially as the tube wall creeps, but it will block most of the outer space and will allow the pleated cylinder to slide against the flat plate and move radially without excessive restriction. The corrugated ring plate may not seal tightly against the pleated cylinder, but it will be flexible in the radial direction and able to move radially as the tube creeps.

Another means for at least partially blocking the downstream end of the central space includes covering the inner hollows and the center area with a "sunburst-shaped" flat plate. The "sunburst-shaped" flat plate may also cover a small portion of the downstream end of the outer hollows. The "sunburst-shaped" flat plate may not be able to move radially as the tube wall creeps, but it will block most of the central space, may block only a small portion of the outer hollows, and will allow the pleated cylinder to slide against the "sunburst-shaped" flat plate and move radially without excessive restriction. The "sunburst-shaped" flat plate may be attached to the rod 50.

When placed in operation, reactants enter the tubular reactor inlet 10 and pass to the inlet 42 to the central space of the most upstream metal structure 32. The reactants react to form products, catalyzed by a catalyst on the surface of the radially expandable side wall 38 or catalyst contained within the metal structure 32. The resulting fluid passes through the plurality of orifices 70 where the resulting fluid squeezes between the metal structure 32 and the tube wall 5 thereby transferring heat between the fluid and the tube wall. The fluid then passes through the plurality of hollows 46 to an adjacent downstream metal structure 32, passing through the inlet to the central space 42 of that respective metal structure 32. The flow is repeated sequentially for each of the metal structures until the fluid, comprising products, passes through the tubular reactor outlet 20.

The plurality of metal structures with radially expandable side walls overcome the heat transfer problem caused by variations in the gap between the inner structure and the tube wall. The metal structures are designed to maintain a constant gap size, regardless of manufacturing tolerances, differential thermal expansion, creep, etc. by providing geometries inherently flexible in the radial direction, such as a pleated cylinder. Since the structure is flexible in the radial direction, the pressure force is sufficient to maintain relatively tight contact between the outer creases of the pleats and the inside surface of the tube wall throughout all operating conditions. Since the creases of the pleats remain tight against the wall, the size of the gap for the gas jets is controlled entirely by the size and shape of the slot or hole that is cut into the pleats, and this does not change with the operating conditions. Therefore the pleated structure is self-adjusting and the heat transfer is not degraded.

The tubular reactor may be used in the conventional manner using known operating conditions, feedstocks, etc. for producing the desired product. Operating adjustments due to improved heat transfer provided by the tubular reactor may be determined by one skilled in the art without undue experimentation.

I claim:

1. A tubular reactor having a tubular reactor inlet and a tubular reactor outlet downstream of the tubular reactor inlet, the tubular reactor comprising:

a tube having a tube wall, and an insert, wherein the insert comprises:

a catalyst; and a plurality of metal structures consecutively arranged in a lengthwise direction of the tube, each of the plurality of metal structures having an upstream end, a downstream end and a radially expandable side wall enclosing a central space between the upstream end and the downstream end, wherein the upstream end defines an inlet to the central space, wherein the central space is at least partially blocked at the downstream end, and wherein the radially expandable side wall defines a plurality of orifices for passing a fluid from the central space toward the tube wall, the plurality of orifices characterized by a hydraulic diameter, d, and a spacing, h, from the tube wall, wherein h/d for the plurality of orifices ranges from 0.05 to 10, and wherein each of the plurality of metal structures form an outer space having a plurality of hollows between the radially expandable side wall of each of the plurality of metal structures and the tube wall, wherein the outer space is at least partially blocked at the upstream end, and wherein the outer space is in fluid flow communication with the inlet of an adjacent downstream metal structure and/or the tubular reactor outlet.

2. The tubular reactor of claim 1 wherein h/d ranges from 0.1 to 1.

3. The tubular reactor of claim 1 wherein h ranges from 0.01 mm to 5 mm.

4. The tubular reactor of claim 1 wherein h ranges from 0.01 mm to 2 mm.

5. The tubular reactor of claim 1 wherein the radially expandable side wall has a thickness ranging from 0.05 mm to 0.5 mm.

6. The tubular reactor of claim 1 wherein the central space is blocked at the downstream end.

7. The tubular reactor of claim 1 wherein the catalyst is supported on the plurality of metal structures.

8. The tubular reactor of claim 1 wherein the catalyst is supported on catalyst pellets.

9. The tubular reactor of claim 8 wherein the catalyst pellets are located in the central space of each of the plurality of metal structures.

10. The tubular reactor of claim 1 wherein the insert comprises a metal substructure situated within the central space of a metal structure of the plurality of metal structures wherein the catalyst is supported on the metal substructure.

11. The tubular reactor of claim 1 wherein the tube is characterized by a cross-sectional area, $A_t$, and wherein the outer space for each of the plurality of metal structures have a cumulative cross-sectional area, $A_a$, wherein $$0.1 \leq \frac{A_a}{A_t} \leq 0.5$$

at any position between the upstream end and the downstream end.

12. The tubular reactor of claim 1 wherein the downstream end of a first of the plurality of metal structures is spaced a distance, D, from a second of the plurality of metal structures, wherein the second of the plurality of metal structures is adjacent and downstream of the first of the plurality of metal structures wherein 0.6 cm<D<50 cm.

13. The tubular reactor of claim 1 wherein the catalyst is a steam reforming catalyst.

* * * * *